Sept. 5, 1961 A. G. QUYNN, JR 2,999,207

DIFFERENCE TOTALIZER

Filed Oct. 1, 1957 2 Sheets-Sheet 1

BINARY ACCUMULATOR

INVENTOR.
ALLEN G. QUYNN, JR.
BY
Mitchell & Bechert

Sept. 5, 1961 A. G. QUYNN, JR 2,999,207

DIFFERENCE TOTALIZER

Filed Oct. 1, 1957 2 Sheets-Sheet 2

INVENTOR.
ALLEN G. QUYNN, JR.
BY
Mitchell & Bechert
ATTORNEYS

United States Patent Office 2,999,207
Patented Sept. 5, 1961

2,999,207

DIFFERENCE TOTALIZER

Allen G. Quynn, Jr., Frederick, Md., assignor, by mesne assignments, to HRB-Singer, Inc., State College, Pa., a corporation of Delaware Filed Oct. 1, 1957, Ser. No. 687,579
17 Claims. (Cl. 328—44)

Figure 1:
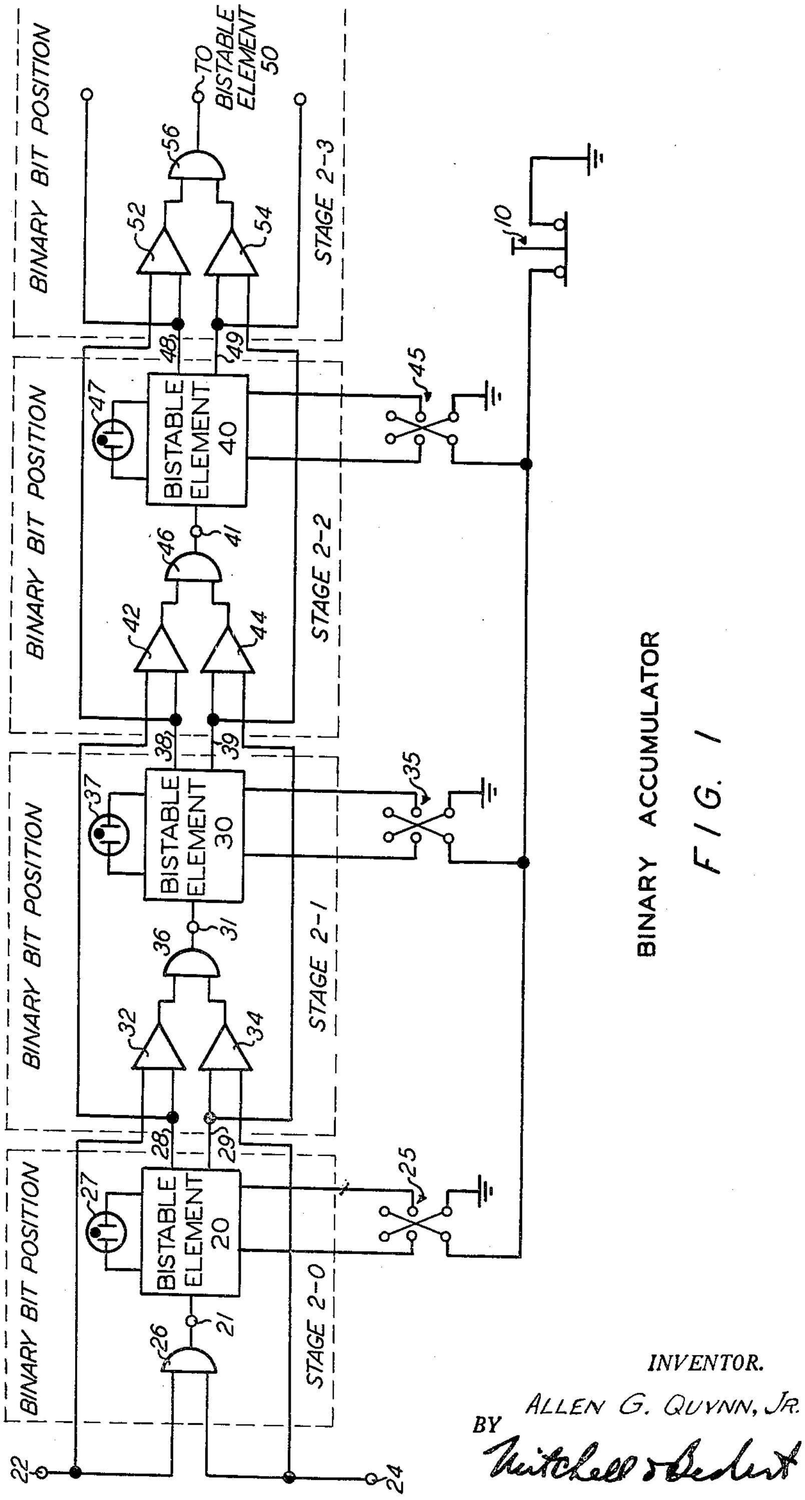

This invention relates to counting and more particularly to accumulating as a number the count resulting from a plurality of intermixed unit additions and subtractions.

Counting procedures arise in many fields. In a manufacturing plant, for example, as each item passes a particular point in an assembly line, it may break a light beam being monitored by a photocell. The photocell generates a pulse which is transmitted to a pulse counter. The pulse counter accumulates a number which represents the count of the items passing on the line.

In automatic control systems it is often necessary to perform an operation a specified number of times before proceeding to the next operation. Thus, a counter is employed which accumulates the total number of operations. When the total reaches the predetermined value, the counter gives an indication which steps the control system to a new operation.

A number in this sense represents the integral count of the basic units of a quantity. In a rudimentary form, the count can be represented by a plurality of similar symbols, one for each basic unit of the quantity. Such a notation may be suitable for small quantities, but it soon becomes unwieldy. Therefore, a more convenient representation, known as positional notation, has evolved. This scheme of representing numbers depends on the type and position of digits in an expression.

A digit is understood to be a symbol representing an integral quantity. The number of different symbols employed in a number system is known as a radix or base. The radix is also an integer.

Formally, positional notation is the scheme for representing a number characterized by the arrangement of the digits in sequence, with the understanding that successive digits are to be interpreted as coefficients of successive powers of the base of the number system. In the common number systems each digit is a symbol which stands for a positive integer smaller than the base.

The usual relationship between the digits, $d_i$, and the number N, may be expressed mathematically as:

$$N=R^n\times d_n+R^{n-1}\times d_n-1+\ .\ .\ .\ +R^1d_1+R^0d_0$$
$$=R^nd_n+R^{n-1}d_{n-1}+\ .\ .\ .\ +R^1d_1+R^0d_0$$

However, the radix multipliers $R^i$ are usually implied in the notation and the number N, is:

$$d_nd_{n-1}\ .\ .\ .\ d_1d_0$$

For example, the number represented by the expression 346 in the decimal number system is:

$$=10^2(3)+10^1(4)+10^0(6)$$
$$=100\times3+10\times4+6$$

Of the many number systems available to represent quantities, there is one, the binary system, which has many desirable properties. The binary system is a number system with a radix of two. Thus, only two digits are required to represent any number. These digits or bits are commonly the symbols zero (0) and one (1). Since only two symbols are required in this number system, the representation of these symbols becomes extremely reliable and easy in electrical and electronic apparatus. Yes and no conditions are all that are required; for example, the presence or absence of a voltage pulse, the stable states of a bistable element, the state of a relay being open or closed.

Any number can be represented in the binary system by the expression:

$$N=a_n2^n+a_{n-1}2^{n-1}+\ .\ .\ .\ +a_12+a_0$$

where the binary coefficients $a_i$ are either zero or one; for example, the decimal number 346 becomes:

$$=101011010$$
$$=1\times2^8+0\times2^7+1\times2^6+0\times2^5+1\times2^4+1\times2^3+0\times2^2+1\times2^1+0\times2^0$$
$$=256+64+16+8+2$$

The first sixteen binary numbers are shown with their decimal equivalent in Table I:

| Decimal: | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
| 16 | 10000 |

A whole class of pulse counters have evolved, dependent on the binary number system. These pulse counters, usually known as binary counters, include bi-stable elements which change from one stable state to the second stable state each time a pulse signal is received. The binary counter is designated to transmit a pulse signal during one of its two possible transitions of state. Thus, one pulse signal is transmitted for each two received. By cascading a plurality of these binary counters a binary accumulator is obtained. Each of the binary counters represents different power of the radix two, and one stable state represents the radix coefficient one, while the other stable state represents the radix coefficient zero. Thus, by knowing the states of each of the binary counters in a binary accumulator, the count of the number of pulse signals entered into the binary accumulator may be obtained.

There is another important counting operation which often arises. This counting operation, known as difference totalizing, is similar to a running inventory count. As each item is added to an inventory, the accumulated total of the items is increased by one, and as each item is removed from the inventory, one is subtracted from the accumulated total of the items.

Binary accumulators have been devised which perform unit additions upon receipt of pulse signals from a first pulse source, and perform unit subtractions upon receipt of pulse signals from a second pulse source. Such binary accumulators usually require complicated circuitry and extra control signals to switch the binary accumulator between unit adding and unit subtracting. The extra circuitry often imposes stringent amplifying and operating time requirements on the binary counters used in a binary accumulator.

It is, therefore, an object of the invention to provide improved binary counting apparatus.

It is another object of the invention to provide improved binary counting apparatus for use in a binary accumulator, which requires a minimum of additional circuitry and no external control signals for counting in ascending or descending order.

It is a further object of the invention to provide an improved binary accumulator which by making use of properties of the binary number system permits the rapid and reliable accumulation of the difference in the count of the number of pulse signals from two pulse signal sources.

The theory of the invention resides in properties of the binary number system. Generally, most binary accumulators rely on two properties of the binary number system for operation. The first property, used during unit additions, is that when a significant bit changes from zero to one, the next more significant bit remains unchanged; however, when the same significant bit changes from one to zero, the next more significant bit changes. The second property, used during subtraction, is that when a significant bit changes from one to zero, the next more significant bit remains unchanged; however, when the significant bit changes from zero to one, the next more significant bit changes. Thus, it is seen that control means is required to indicate addition or subtraction, since the changing of a bit may or may not affect the next more significant bit.

The invention, however, relies on only one property of the binary system which is common to both unit addition and unit subtraction. A significant bit of a binary number will always change whenever the two preceding bits lower in significance both change from the same first integer to the same second integer. For example, a significant bit will change when the two preceding bits lower in significance; both change from one to zero, or both change from zero to one. This phenomenon occurs regardless of whether increasing or decreasing counts are being accumulated. Vertification may be found in Table I.

By way of example, when the count is increased from three to four, the two least significant bits both change from one to zero, and the third least significant bit changes from zero to one. However, when the count increases from four to five, the least significant bit changes from zero to one, but the second least significant bit remains unchanged; the third least significant bit, therefore, does not change. Similarly, when the count decreases from twelve to eleven, the two least significant bits change from zero to one and, therefore, the third least significant bit changes from one to zero. However, when the count decreases from eleven to ten, the least significant changes from one to zero, but the second least significant bit remains unchanged; the third least significant bit, therefore, remains unchanged. Thus, it is seen that the property holds true for both unit addition and unit subtraction and no control signals are required to indicate the type of unit change.

Therefore, in accordance with the theory of the invention, apparatus is provided for accumulating a count of pulse signals as a binary representation. The apparatus includes a plurality of bi-stable elements. The bi-stable elements are serially disposed to represent the significant bit positions of a binary number. Each of the bi-stable elements has a first stable state which represents the binary coefficient one and a second stable state which represents the binary coefficient zero. Each of the bi-stable elements transmits a first kind of indication during a transition from the first stable state to the second stable state and a second kind of indication during a transition from the second stable state to the first stable state. Each of the bi-stable elements in responsive to the two preceding elements in the series to change stable states whenever the two preceding elements transmit the same kind of indication.

It should be noted that since each bi-stable element is solely dependent on the two preceding elements in the series, the capacity of the accumulating apparatus is readily expandable to accommodate any size binary number without imposing heavy loads on the preceding bi-stable elements.

It should also be noted that the bi-stable elements may be standardized plug in units which are coupled together with a minimum of interconnections.

Figure 2:
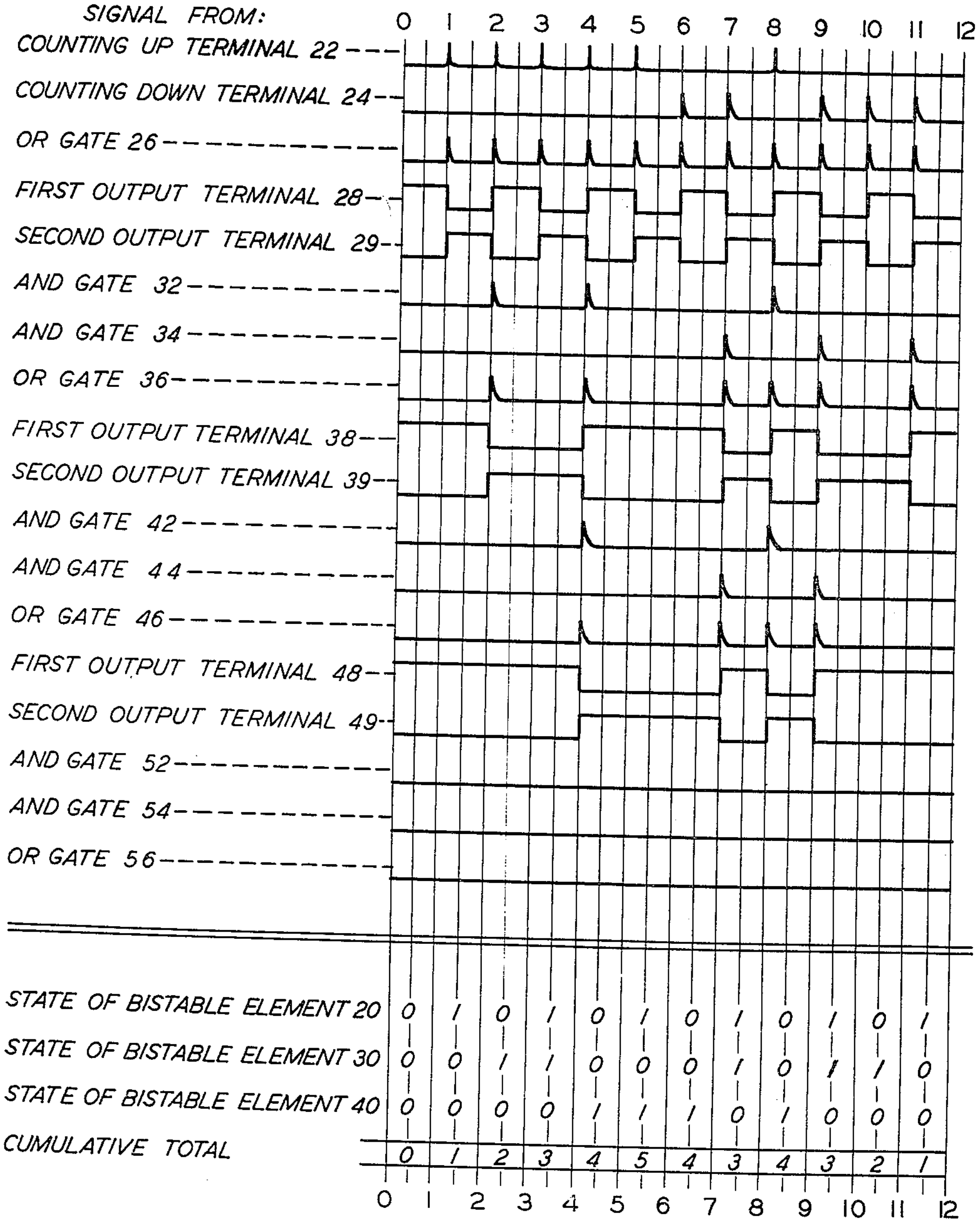

Other objects, features and advantages of the invention will be evident from the following detailed description when read in connection with the accompanying figures wherein:

FIGURE 1 shows in block diagram form binary accumulating apparatus in accordance with a preferred embodiment of the invention; and FIGURE 2 is a graph of waveforms associated with the various elements of the binary accumulating apparatus of FIGURE 1 during an illustrative accumulation of the count of pulse signals.

Referring to FIGURE 1, a portion of a binary accumulator is shown comprising a plurality of serially disposed binary bit position stages 2–$n$, representing powers of the radix two. The first binary bit position stage 2–0 represents the least significant bit position of a binary number, the second binary bit position stage 2–1 represents the second least significant bit position of a binary number, the third binary bit position stage 2–2 represents the third least significant bit position of a binary number, etc.

Each of the binary bit position stages includes a bi-stable element which has two stable states, a first stable state (the one state) representing the binary coefficient one, and a second state (the zero state) representing the binary coefficient zero. The bi-stable element, upon receipt of a pulse signal, changes state and transmits opposite polarity signals from first and second output terminals. The polarity of the output signals reverses for opposite changes of state. In particular, a positive going signal is transmitted from the first output terminal during a change from the one state to the zero state and a negative going signal during the change from the zero state to the one state. Each of the bi-stable elements contains an indicator for giving a visual indication whenever the bi-stable element is in the one state.

During operation of the binary accumulator, an add input terminal 22 receives pulse signals which are to be unit added to the count stored in the binary accumulator, and a subtract input terminal 24 receives pulse signals to be unit subtracted from the count stored in the binary accumulator. Either of these pulse signals is fed to the first binary position stage 2–0, causing its bi-stable element to change stable states. If the pulse signal is from the add input terminal 22 and the bi-stable element of the first binary bit position stage 2–0 changes from the one state to the zero state, the bi-stable element of the second binary bit position stage 2–1 changes state. However, if the opposite state change occurred in the bi-stable element of the first binary bit position stage 2–0, then the bi-stable element of the second binary bit position stage 2–1 does not change state. If the pulse signal is from the subtract input terminal 24 and the bi-stable element of the first binary bit position stage 2–0 changes from the zero state to the one state, the bi-stable element of the second binary bit position stage 2–1 changes state. However, if the bi-stable element of the first binary bit position stage 2–0 changed from the one state to the zero state, the bi-stable element of the second binary bit position stage 2–1 does not change state.

The third binary bit position stage 2–2 is responsive to both the second binary bit position stage 2–1 and the first binary bit position stage 2–0. When the bi-stable elements of both of these bit position stages change from the one state to the zero state, or when both change from the zero state to the one state, the bi-stable element of the third binary bit position stage 2–2 changes state.

Each of the binary bit position stages, except the first binary bit position stage 2–0, comprises the same elements. A typical binary bit position stage 2–2 includes a bi-stable element 40 having a first output terminal 48 and a second output terminal 49. The bi-stable element 40 may be a flipflop of known kind such as a vacuum tube trigger circuit; magnetic core, transistor and similar flipflops are equally useful. The requirements on the flipflop are that, upon receipt of a pulse signal at its input terminal 41, it changes stable states. In changing stable states, opposite polarity signals are transmitted from its output terminals. For example, in change from the one state to the zero state, the first output terminal 48 transmits a positive going signal and the second output terminal 49 a negative going signal, and in changing from the zero state to the one state the first output terminal 48 transmits a negative going signal and the second output terminal 49 a positive going signal. The igniting of the neon bulb or indicator 47 is controlled by the circuitry within the bi-stable element 40 such that the bulb is glowing during the one state and is extinguished during the zero state.

The third binary bit position stage 2–2 includes an "or" gate 46 having two input terminals, and an output terminal coupled to input terminal 41 of the bi-stable element 40. The "or" gate 46 may be of known kind which satisfies the condition that it shall transmit from its output terminal a signal present at either of its input terminals. For example, if a positive signal is present at either of its input terminals a positive signal is transferred to its output terminal.

A first "and" gate 42 has a first and second input terminal and an output terminal coupled to a first input terminal of the "or" gate 46. The first input terminal is coupled to the first output terminal 28 of the bi-stable element 20, and the second input terminal is coupled to the first output terminal 38 of the bi-stable element 30.

A second "and" gate 44 has first and second input terminals and an output terminal coupled to the second input terminal of the "or" gate 46. The first input terminal is coupled to the second output terminal 29 of the bistable element 20, and the second input terminal is coupled to the second output terminal 39 of the bistable element 30.

Both of the "and" gates 42 and 44 may be one of the well known coincidence type. For example, the "and" gates may have the property of transmitting a positive going signal from their output terminals upon the simultaneous receipt of positive going signals at their input terminals.

The first binary position stage 2–0 has no "and" gates; instead, the first input terminal of the "or" gate 26 is coupled to the add input terminal 22, and the second input terminal is coupled to the subtract input terminal 24. Except for this difference this stage is similar to the third binary position stage 2–2.

The operation of the binary accumulator of FIGURE 1 will now be described with reference to the waveforms of FIGURE 2. Initially, all the bi-stable elements are in the zero state. At pulse time *one*, a positive pulse signal is received by the add input terminal 22. The positive pulse signal passes through the "or" gate 26 to flip the bi-stable element 20 to the one state. A negative going signal is transmitted from the first output terminal 28, and a positive going signal is transmitted from the second output terminal 29 of the bi-stable element 20. It should be noted that neither of theses signals causes any state change in the bi-stable element 30, for at least one of the input terminals of each of the "and" gates 32 and 34 is not receiving a positive going signal.

At pulse time *two*, a second positive pulse signal is received at the add input terminal 22. The positive pulse signal passes through the "or" gate 26 to flip the bi-stable element 20 into the zero state. A positive going signal is transmitted from the first output terminal 28 and a negative going signal is transmitted from the second output terminal 29. Both input terminals of the "and" gate 32 simultaneously receive positive going signals from the add input terminal 22 and the first output terminal 28. The "and" gate 32 transmits a positive going signal through the "or" gate 36 to flip the bi-stable element 30 to the one state.

At pulse time *three*, a third pulse signal is received by the add input terminal 22, and the bi-stable element 20 flips to the zero state generating the usual signals. The situation after the pulse time *three* shows both bi-stable elements 20 and 30 in the one state.

At pulse time *four*, a fourth pulse signal is received by the add input terminal 22. The bi-stable element 20 flips to the zero state, transmitting a positive going signal to the second input terminal of the "and" gate 32 to coincide with the positive going pulse from the add input terminal 22 which is feeding the first input terminal of the "and" gate 32. The "and" gate 32 transmits a positive going pulse signal through the "or" gate 36, causing the bi-stable element 30 to flip to the zero state, resulting in the transmission of a positive going signal by the first output terminal 38. The positive going signal from the first output terminal 38 coincides with the positive going signal from the first output terminal 28 at the "and" gate 42. The "and" gate 42, therefore, transmits a positive going signal through the "or" gate 46 to flip the bi-stable element 40 to the one state. Thus, only until both the bi-stable elements 20 and 30 changed from the one state to the zero state did the third bi-stable element change state. The count in the binary accumulator is four.

At pulse time *five*, a fifth pulse signal is received by the add input terminal 22 to increase the count in the binary accumulator by one. The pulse signal causes the flipping of the bi-stable element 20 to the one state in the usual manner. The bi-stable element 20 is now in the one state, the bi-stable element 30 in the zero state, and the bi-stable element 40 in the one state, indicating a count of five.

At pulse time *six*, a pulse signal is received by the subtract input terminal 26 to subtract one from the count. The pulse signal passes through the "or" gate 26 to flip the bi-stable element 20 to the zero state causing the generation of a negative going signal from the second output terminal 29. None of the succeeding bi-stable elements are affected.

At pulse time *seven*, a second pulse signal is received by the subtract input terminal 24. The bi-stable element 20 flips to the one state causing the transmission of a positive going signal from its second output terminal 29. The positive going signal coincides with the positive going pulse from the subtract input terminal 24 at the second "and" gate 34. The second "and" gate 34 accordingly transmits a positive going signal which passes through the "or" gate 36 to flip the bi-stable element 30 to the one state, resulting in the transmission of a positive going signal from its second output terminal 39. The positive going signal coincides with the positive going signal from the second output terminal 29 at the second "and" gate 44. The second "and" gate 44, therefore, transmits a positive going signal through the "or" gate 46 to flip the bi-stable element 40 to the zero state. Thus, not until both the bi-stable elements 20 and 30 change from the zero state to the one state did the bi-stable element 40 change state.

In a similar manner, FIGURE 2 shows the operation of the binary accumulator for further unit additions and unit subtractions.

An immediate reading of the count in the binary accumulator is obtained by viewing the neon bulbs associated with each of the bi-stable elements. For example, between pulse time seven and pulse time eight, only the neon bulbs 27 and 37 are glowing to indicate a count of three.

For some applications, it is desirable to clear the binary accumulator to zero and manually insert an initial count. This operation of resetting and presetting of the binary accumulator may be accomplished in many ways. For example, when the bi-stable elements are of the vacuum-tube trigger-circuit type, it is only necessary to momentarily open the grid-return circuits of preselected vacuum tubes of the trigger circuits. The opening of such a grid-return circuit causes the associated vacuum tube to conduct and the other vacuum tube of the pair to cut off. Thus, it is possible to change the state of a bi-stable element by opening the appropriate grid-return circuit. Accordingly, each of the bi-stable elements may include a double-pole double-throw switch (such as the switch 45) coupled to the bi-stable element 40. By throwing the switch 45 to a predetermined position, it is possible to preselect the state of the bi-stable element 40.

In a similar manner, the switches 25 and 35 are set in a predetermined position. When the normally closed switch 10 is momentarily depressed (opened), preselected grid-return circuits are opened in the bi-stable elements, causing the establishment of particular states. If all the states are the zero state, then the binary accumulator is cleared to zero.

It will be understood that with other types of bi-stable elements, it is equally possible to inject controlled transients which cause the bi-stable elements to assume desired initial states.

It should be noted that, from an engineering point of view, the pulse signals used must have sufficient width so that they are still present when a bi-stable element is flipped and starts transmitting signals from its output terminals.

In some applications it may be necessary to differentiate the signals from the output terminals of the bi-stable elements when they are fed to the "and" gates so that gating only occurs on their leading edges.

Thus, improved binary accumulating apparatus has been shown which by making use of a property of the binary number system requires a minimum of extra circuitry and no control signals to indicate whether a unit addition or subtraction is to be performed.

There will be now obvious to those skilled in the art, many modifications and variations utilizing the principles set forth and realizing many or all of the objects and advantages of the circuits described but which do not depart essentially from the spirit of the invention, as defined in the claims which follow.

I claim:

1. Apparatus for binary counting, comprising N bi-stable means for representing the powers of two, each of said N bi-stable means having a first and a second stable state wherein the Mth bi-stable means (M being an integer smaller in magnitude than N) is responsive only to both the (M−1) bi-stable means and the (M−2) bi-stable means such that when said (M−1) bi-stable means and said (M−2) bi-stable means change from the first stable state to the second stable state the Mth bi-stable means changes stable states.

2. Apparatus for binary counting, comprising N bi-stable means coupled in series to represent the coefficients of the power of two, each of said N bi-stable means having a first and a second stable state wherein the Mth bi-stable means in the series (M being an integer smaller in magnitude than N) is directly responsive only to both the (M−1) bi-stable means and the (M−2) bi-stable means such that when said (M−1) bi-stable means and said (M−2) bi-stable means change from the first stable state to the second stable state the Mth bi-stable means changes stable states.

3. Apparatus for accumulating a number in binary form, comprising a plurality of bi-stable elements serially disposed to represent the powers of two, each of said bi-stable elements having a first stable state to indicate the binary coefficient one, and having a second stable state to indicate the binary coefficient zero, each of said bi-stable elements being responsive only to the first and second preceding bi-stable elements in the series to change stable states when said first and second preceding bi-stable elements simultaneously change to the same stable state.

4. Apparatus for accumulating a number in binary form, comprising a plurality of bi-stable elements, said bi-stable elements being serially disposed to represent the significant bit positions of a binary number, each of said bi-stable elements having a first stable state to indicate the binary coefficient one of a significant bit position, and having a second stable state to indicate the binary coefficient zero of a significant bit position, each of said bi-stable elements representing a significant bit position being directly responsive only to the two preceding bi-stable elements which represent the two lesser significant bit positions of a binary number to change stable states when said two preceding bi-stable elements simultaneously change to the same stable state.

5. A totalizer for accumulating the difference in the number of pulse signals transmitted from a first and a second signal source, comprising a first input means responsive to the first signal source, a second input means responsive to the second signal source, a plurality of bi-stable elements serially disposed to represent the significant bit positions of a binary number, each of said bi-stable elements having a first stable state to represent the binary bit one and a second stable state to represent the binary bit zero, the first of said bi-stable elements representing the last significant bit position being responsive to said first and said second input means to change stable states upon receipt of a pulse signal by either, and each of the bi-stable elements representing the more significant bit positions being responsive only to the two bi-stable elements representing the two next lesser significant bit positions to change stable states when both of said two bi-stable elements simultaneously change to the same stable state.

6. A totalizer for accumulating the difference in the number of pulse signals transmitted from a first and a second signal source, comprising a first input means responsive to the first signal source, a second input means responsive to the second signal source, a plurality of bi-stable elements serially disposed to represent the significant bit positions of a binary number, each of said bi-stable elements having a first stable state to represent the binary bit one and a second stable state to represent the binary bit zero, the first of said bi-stable elements being responsive to said first and said second input means to change stable states upon receipt of a pulse signal by either, the second of said binary elements being responsive to said first bi-stable element and to either said first or said second input means to change stable states dependent on the stable state of said first bi-stable means, and each of the remaining bi-stable elements of said plurality being responsive to the first and second preceding bi-stable elements to change stable states when both said first and said second preceding bi-stable elements simultaneously change to the same stable state.

7. Binary counting apparatus, comprising first, second and third bi-stable elements, each of said bi-stable elements having an output means, said output means transmitting a first kind of signal when the associated bi-stable element changes from a first stable state to a second stable state and transmitting a second kind of signal when the associated bi-stable element changes from the second stable state to the first stable state, said third bi-stable element being responsive only to the output means of said first and said second bi-stable elements to change state when both of said output means transmit the first kind of signal.

8. Binary counting apparatus, comprising first, second and third bistable elements, each of said bi-stable elements having a first and second output means, said first output means transmitting a first kind of signal when the associated bi-stable element changes from a first stable state to a second stable state and transmitting a second kind of signal when the associated bi-stable element changes from the second stable state to the first stable state, said second output means transmitting the second kind of signal when the associated bi-stable element changes from the first stable state to the second stable state and transmitting the first kind of signal when the associated bi-stable element changes from the second stable state to the first stable state, said third bi-stable element being responsive only to the first output means of said and said second bi-stable elements to change state when both of said output means transmit the first kind of signal, and said third bi-stable element being responsive to the second output means of said first and second bi-stable elements to change stable states when both of said output means transmit the first kind of signal.

9. Apparatus for accumulating in binary representation the difference in the count of the number of pulse signals transmitted from a first and a second source of pulse signals, comprising a first input means responsive to the first source of pulse signals, a second input means responsive to the second source of pulse signals, a plurality of bi-stable elements serially disposed to represent the significant bit positions of a binary number, each of said bi-stable elements having a first and a second stable state for representing the binary bits, each of said bi-stable elements having an output means to transmit a first kind of signal when the associated bi-stable element changes from the first stable state to the second stable state and a second kind of signal when the associated bi-stable element changes from the second stable state to the first stable state, the first of said bi-stable elements representing the least significant bit position being responsive to said first and second input means to change stable states when either receives a pulse signal, the second of said bi-stable elements being responsive to the output means of said first bi-stable element and said first and second input means to change stable states when a predetermined combination of signals are received from said first and second input means and the output means of said first bi-stable element, the remainder of said bi-stable elements being responsive to the output means of the two preceding bi-stable elements in the series to change stable states upon receipt of the same kind of signals from said output means.

10. Apparatus for accumulating a binary representation the difference in the count of the number of pulses transmitted from a first and a second source of pulse signals, comprising a first input means responsive to the first source of pulse signals, a second input means responsive to the second source of pulse signals, a plurality of bi-stable elements serially disposed to represent the significant bit positions of a binary number, each of said bi-stable elements having a first and a second stable state for representing the binary bits, and each of said bi-stable elements having first output means for transmitting a first kind of signal when the associated bi-stable element changes from the first stable state to the second stable state and a second kind of signal when the associated bi-stable element changes from the second stable state to the first stable state, and a second output means for transmitting the second kind of signal when the associated bi-stable element changes from the first stable state to the second stable state, and the first kind of signal when the associated bi-stable device changes from the second stable state to the first stable state, the first of said bi-stable elements representing the least significant bit position being responsive to said first and second input means to change stable states whenever either receives a pulse signal, said second bi-stable element representing the second least significant bit position being responsive to said first input means and the first output means of said first bi-stable element to change stable states when said first input means receives a pulse signal and the first output means of said first bi-stable device transmits the first kind of signal, and said second bi-stable element being responsive to said second input means and the second output means of said first bi-stable device to change stable states when said second input means receives a pulse signal and the second output means of said first bi-stable element transmits the first kind of signal, and each of the remainder of said bi-stable elements being responsive to the first output means of the two preceding bi-stable elements in the series to change stable states when both of said first output means transmit a first kind of signal and being responsive to the second output means of the two preceding bi-stable elements in series to change states when both of said second output means transmit a first kind of signal.

11. Binary counting apparatus, comprising first, second and third bi-stable elements, each of said bi-stable elements having an input means and first and second output means, the first output means of each of said bi-stable elements transmitting a first kind of signal when the associated bi-stable element changes from a first stable state to a second stable state, the second output means of each of said bi-stable elements transmitting the first kind of signal when the associated bi-stable changes from the second stable state to the first stable state, a first gating means responsive to the first output means of said first and second bi-stable elements to transmit a signal when both of said first output means simultaneously transmit the first kind of signal, a second gating means responsive to the second output means of said first and said second bi-stable elements to transmit a signal when both of said second output means simultaneously transmit the first kind of signal, the input means of said third bi-stable element being responsive only to said first and second gating means to cause said third bi-stable to change stable states when either said first or said second gating means transmits a signal.

12. Binary counting apparatus, comprising first, second and third bi-stable elements, each of said bi-stable elements having an input means, and first and second output means, the first output means of each of said bi-stable elements transmitting a first kind of signal when the associated bi-stable element changes from a first stable state to a second stable state, the second output means of each of said bi-stable elements transmitting the first kind of signal when the associated bi-stable element changes from the second stable state to the first stable state, a first "and" gating means responsive only to the first output means of said first and second bi-stable elements to transmit a signal when both of said output means simultaneously transmit the first kind of signal, a second "and" gating means responsive only to the second output means of said first and said second bi-stable elements to transmit a signal when both of said second output means simultaneously transmit the first kind of signal, and "or" gating means responsive to said first and second "and" gating means to transmit a signal when a signal is received from said first or said second "and" gating means, and the input means of said third bi-stable elements being responsive only to said "or" gating means to cause a change in its stable states when said "or" gating means transmits a signal.

13. Apparatus for accumulating as a binary number the difference in the count of the number of pulse signals from two sources of pulse signals, comprising a first input terminal for receiving the pulse signals from the first source of pulse signals, a second input terminal for receiving the pulse signals from the second source of pulse signals, a plurality of bi-stable elements serially disposed to represent the significant bit positions of the binary number, each of said bi-stable elements having an input means which upon receipt of a signal causes the associated bi-stable element to change stable states, a first output means for transmitting a first kind of signal when the associated bi-stable element changes from a first stable state to a second stable state, a second output means for transmitting a first kind of signal when the associated bi-stable elements change from the second stable state to the first stable state, the input means of the first of said bi-stable element representing the least significant bit position being responsive to said first and said second input terminals to change stable states whenever a pulse signal is received by either of said input terminals, a first gating means associated with the second bi-stable element of the series representing the second least significant bit position and responsive to the first output means of the first bi-stable element and to said first input terminal to transmit a signal when a pulse signal is received by said first input terminal simultaneously with the transmission of the first kind of signal by the first output means of said first bi-stable element, a second gating means associated with the second bi-stable element and responsive to said second input terminal and the second output means of said first bi-stable element to transmit a signal when a pulse signal is received by said second input terminal simultaneously with the transmission of a first kind of signal by the second output means of said first bi-stable element, the input means of said second bi-stable element being responsive to the first and second gating means associated with said second bi-stable element to change the stable state of said second bi-stable element upon receipt of a signal, a first gating means associated with the third bi-stable element of the series representing the third least significant bit position and responsive to the first output means of said first and second bi-stable elements to transmit a signal when the first output means of said first and second bi-stable elements transmit the first kind of signal, and second gating means associated with said third bi-stable element and responsive to the second output means of said first and second bi-stable elements to transmit a signal when both said second output means transmit the first kind of signal, the input means of said third bi-stable means being responsive to the first and second gating means associated with said third bi-stable element means to change the stable state of said third bi-stable element upon receipt of a signal.

14. The apparatus of claim 13, wherein each of the input means associated with each of the bi-stable elements includes "or" gating means.

15. The apparatus of claim 13, wherein each of the bi-stable elements includes a visual indicator for indicating the state of the bi-stable element.

16. The apparatus of claim 13, including means for initially establishing the zero stable state in each of the bi-stable elements.

17. The apparatus of claim 13, including means for establishing an initial count by presetting each of the bi-stable elements to a predetermined stable state.

References Cited in the file of this patent

UNITED STATES PATENTS

| | | |
|---|---|---|
| 2,734,684 | Ross, Jr., et al. | Feb. 14, 1956 |
| 2,735,005 | Steele | Feb. 14, 1956 |
| 2,850,232 | Hagen et al. | Sept. 2, 1958 |

UNITED STATES PATENT OFFICE

CERTIFICATION OF CORRECTION

Patent No. 2,999,207 September 5, 1961

Allen G. Quynn, Jr.

It is hereby certified that error appears in the above numbered patent requiring correction and that the said Letters Patent should read as corrected below.

Column 9, line 9, after "said", first occurrence, insert -- first --.

Signed and sealed this 3rd day of April 1962.

(SEAL)
Attest:

ERNEST W. SWIDER
Attesting Officer

DAVID L. LADD
Commissioner of Patents